United States Patent
Fröhlich et al.

(10) Patent No.: US 10,182,586 B2
(45) Date of Patent: Jan. 22, 2019

(54) USE OF SILICATE PARTICLES IN BEVERAGE PRODUCTION

(71) Applicant: Erbslöh Geisenheim AG, Geisenheim (DE)

(72) Inventors: Jürgen Fröhlich, Mainz (DE); Volker Müller, Homburg (DE); Anne Besier, Schlangenbad (DE)

(73) Assignee: ERBSLÖH GEISENHEIM AG (DE)

(*) Notice: Subject to any disclaimer, the term of this patent is extended or adjusted under 35 U.S.C. 154(b) by 170 days.

(21) Appl. No.: 14/066,320

(22) Filed: Oct. 29, 2013

(65) Prior Publication Data
US 2014/0120211 A1 May 1, 2014

(30) Foreign Application Priority Data
Oct. 31, 2012 (EP) .................................... 12190920

(51) Int. Cl.
C12C 7/04 (2006.01)
A23L 2/38 (2006.01)
A23L 2/80 (2006.01)
C12H 1/044 (2006.01)
C12C 11/00 (2006.01)
A23L 2/52 (2006.01)

(52) U.S. Cl.
CPC ..................... A23L 2/38 (2013.01); A23L 2/52 (2013.01); A23L 2/80 (2013.01); C12C 7/04 (2013.01); C12C 11/00 (2013.01); C12H 1/0408 (2013.01)

(58) Field of Classification Search
CPC ........... A23L 2/80; C12H 1/0408; C12C 7/14; C12C 7/24; C12C 7/26
USPC .................................................. 426/16, 271
See application file for complete search history.

(56) References Cited

U.S. PATENT DOCUMENTS

| 2,433,411 A | 12/1947 | Wallerstein |
| 4,338,348 A | 7/1982 | Muller |
| 4,539,118 A * | 9/1985 | Crider ...................... C12Q 1/26 210/683 |
| 4,652,452 A | 3/1987 | Hiatt et al. |

FOREIGN PATENT DOCUMENTS

| CA | 528288 A * | 7/1956 |
| DE | 3030185 A1 * | 4/1982 |
| GB | 465692 | 5/1937 |
| GB | 688815 A * | 3/1953 |
| GB | 1073924 | 6/1967 |
| WO | 2002070643 A1 | 9/2002 |

OTHER PUBLICATIONS

L. Narzib et al., "Untersuchungen zum Gushing-Problem," Monatsschrift fur Brauwissenschaft, Bd. 43, Nr. 9, 1. Jan. 1990.
L. Karimi et al., "The role of bentonite particle size distribution on kinetic of cation exchange capacity," Journal of Industrial and Engineering Chemistry, Bd. 17, Nr. 1, 12. Jul. 2010.
European Search Report pertaining to corresponding EP Application No. 12190920.4, dated Mar. 25, 2013.

* cited by examiner

*Primary Examiner* — Vera Stulii
(74) *Attorney, Agent, or Firm* — Marsh Fischmann & Breyfogle LLP

(57) ABSTRACT

The use of a material in the production of a beverage, wherein the material particles are added in the course of the production process to a starting material or an intermediate product of the beverage and are then separated off again prior to finishing of the beverage, wherein the particles of the material are characterized in that they at least partially comprise a silicate, wherein the silicate particles with respect to the total weight of the particles have a proportion of at least one metal ion in the range of between 1.5 and 30% by weight, wherein the at least one metal ion is selected from a metal ion of the elements La, Ce, Cu, Ag, Zn, Sn, Ca, Mg, Fe and Mn.

18 Claims, 2 Drawing Sheets

USE OF SILICATE PARTICLES IN BEVERAGE PRODUCTION

RELATED APPLICATIONS

This application claims priority under 35 U.S.C. § 119 to European Patent Application No. 12190920.4, filed Oct. 31, 2012, entitled "USE OF SILICATE PARTICLES IN BEVERAGE PRODUCTION" which is incorporated herein by reference in its entirety.

FIELD OF THE INVENTION

The present invention concerns the use of a particulate material in the production of a beverage, wherein the material particles are added in the course of the production process to a starting material or an intermediate product of the beverage and are then separated off again prior to finishing of the beverage. The present invention also concerns a method of producing a beverage in which the particles are used in accordance with the present invention in the above-indicated fashion.

BACKGROUND OF THE INVENTION

There are some constituents of the starting materials used in the production of beverages, which can detrimentally affect the implementation of the production process or the quality of the end product. For example when opening beer bottles, so-called gushing frequently occurs.

The term gushing is used to denote an uncontrolled and abrupt escape of foam and beer when opening a beer bottle, which is not caused by high temperatures or shaking. That phenomenon occurs again and again in entire beer batches and is extremely unpleasant for the consumer. Various factors are discussed as being the causes of gushing.

Triggers of so-called primary gushing are hydrophobins and further fungal metabolites (polar lipids, proteolytic decomposition products of lipotransfer proteins (LPT)), which are deposited at phase interfaces and modify the interface energy thereof, which has an effect on the growth of crystals from aqueous solution.

Hydrophobins are small surface-active amphiphilic proteins (about 100 amino acids) which are deposited in particular from filamentous fungi of the genus *Fusarium* and which pass into the beer by way of grain infected with those fungi. They spontaneously aggregate to form very stable, monomolecular membranes and have a tendency to micellization.

Secondary or technological gushing is caused by calcium oxalate precipitations caused by the process engineering involved and metal ions like for example $Fe^{3+}$. It will be noted however that rinsing agent residues as well as rough surfaces of the containers or bottles are sometimes found to be the causes of gushing.

Oxalic acid is present in the malt in high levels of concentration. In the wort oxalic acid is in the range of <60 mg/l, while in the beer it is still present in the region of <25 mg/l. If that oxalic acid precipitates in the form of calcium oxalates many crystal crystallization seeds are formed for gas bubble formation. The greater the number of particles, the correspondingly higher is the gas bubble formation potential.

Over half of the breweries have already once had problems with the gushing phenomenon. In that respect all five high-turnover main kinds of beer like Pils, lager, Export and wheat beer have been affected. As gushing not only results in a loss of image in respect of breweries, but all malt houses are also indirectly affected thereby, both the brewery industry and also the malt industry are highly interested in methods of and processes for avoiding gushing.

Hitherto there has not been a guaranteed method which could adequately prevent gushing. In spite of recent knowledge regarding the cause of gushing it has hitherto not been possible to control the occurrence thereof in the industry.

Admittedly hops are known for their slightly gushing-suppressing effect so that in part the attempt was made to reduce the problem by the addition of isomerized hop oils to the brewing process. A disadvantage of that approach however is that the beer aroma is markedly influenced by the increase in the proportion of hops. In Germany an increase in the proportion of hops is also not allowed because of the purity requirement.

As the occurrence of hydrophobins is very greatly weather-dependent, some barley and thus malt years are affected more greatly than others. Frequently therefore various malt batches are blended to minimize at least primary gushing. That however means that the malt houses are involved in an increased storage implementation if different malt batches from different years with a differing gushing potential are to be blended. In addition at the present time there is not a reliable convincing test method for determining the gushing potential of malt.

$CO_2$ release at calcium oxalate precipitations is often counteracted by meteredly adding soluble calcium salts ($CaSO_4$, $CaCl_2$) in the mashing-in operation by way of the brewing water. Difficultly soluble calcium oxalate is then precipitated during the cold storage phase of the green beer, and can then be removed in specifically targeted fashion with the sedimented yeast or in the filtration process. That method however entails the disadvantage that the calcium salts must be very highly metered ($CaSO_4$:Ca oxalate in the ratio>5:1). The total salt content of the later beer is markedly altered thereby. In addition $CaCl_2$ and $CaSO_4$ markedly influence the flavor of the beer. $CaCl_2$ can also lead to chloride corrosion effects in relation to high-quality steel.

Particularly promoted by the fact that the added calcium salt reduces the pH value, which increases the solubility of calcium oxalate and thus counteracts complete precipitation of calcium oxalate, there is in addition the danger that the non-precipitated $Ca^{2+}$ ions and oxalic acid are dragged over the filters. That can entail further precipitation of calcium oxalate after filtration, which can lead to unwanted clouding of the beer or can trigger gushing after having been filled into bottles. That effect can be increased in particular by additional calcium absorption from the kieselguhr of the filter.

To sum up it can be established: hitherto there is not a reliable and secure method of preventing gushing. The existing methods require an additional method step or markedly affect the aroma profile of the beer product.

In relation also to other beverages such as for example in wine production or in the production of fruit juices, the starting materials used in the production of those beverages involve constituents which can detrimentally influence the implementation of the production process or the quality of the end product, like for example high tartaric acid contents in the must or high contents of other fruit acids in the juice of different kinds of fruit.

SUMMARY OF THE INVENTION

Therefore the object of the present invention is that of affording for beverage production a possible way of succeeding in reducing or even entirely eliminating the constituents of the starting materials, that are unwanted in the production process or in the end product, such as for example fruit acids, proteins or polar lipids, at a minimum level of complication and expenditure and inexpensively, without in that respect markedly impairing the aroma profile of the product.

DESCRIPTION OF THE INVENTION

Figure 1:
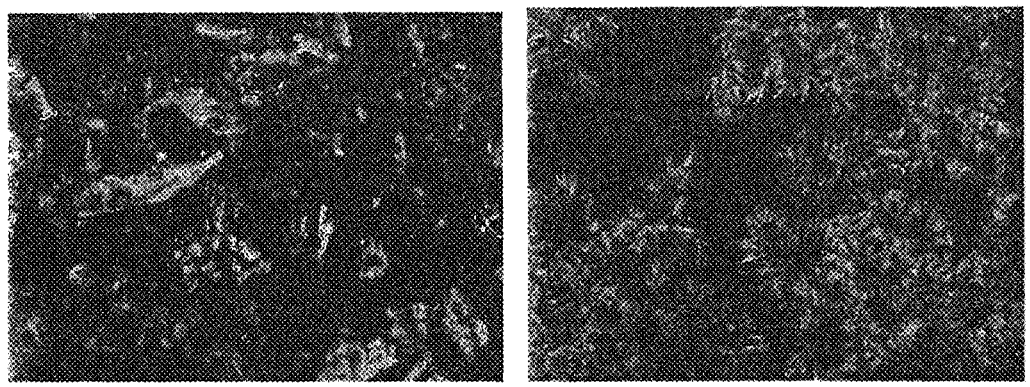
FIG. 1 shows the SEM phase contrast images of silicate particles according to the invention on the basis of pure silicate.

According to the invention that object is attained by the use of a particulate material in the production of a beverage, wherein the material particles are added in the course of the production process to a starting material or an intermediate product of the beverage and are then separated off again prior to finishing of the beverage, wherein the particles of the material are characterised in that they at least partially comprise a silicate, wherein the silicate particles with respect to the total weight of the particles have a proportion of at least one metal ion in the range of between 1.5 and 30% by weight, wherein the at least one metal ion is selected from a metal ion of the elements La, Ce, Cu, Ag, Zn, Sn, Ca, Mg, Fe and Mn.

Preferably the proportion of the at least one metal ion with respect to the total weight of the particles is at least 2% by weight. Still more preferably the proportion of the at least one metal ion with respect to the total weight of the particles is at least 5% by weight. In particularly preferred embodiments the proportion of the at least one metal ion with respect to the total weight of the particles is at least 8% by weight. In particularly preferred embodiments the proportion of the at least one metal ion with respect to the total weight of the particles is at least 10% by weight. In certain embodiments the proportion of the at least one metal ion with respect to the total weight of the particles is even at least 15% by weight or indeed at least 20% by weight.

In many embodiments it may be advantageous if the proportion of the at least one metal ion with respect to the total weight of the particles is less than 30% by weight. In certain embodiments the proportion of the at least one metal ion with respect to the total weight of the particles is limited to a maximum of 25% by weight or indeed only 20% by weight.

Detection of the metal ion content of the particles according to the invention can be effected for example by atomic absorption spectrometry (AAS) or by mass spectrometry with inductively coupled plasma (ICP-MS).

The present invention also embraces combinations which have two or more of the above-specified metal ions, with the proviso that at least one of the metal ions is contained with a minimum proportion in the above-specified ranges in the silicate particles and the sum of the two or more of the above-specified metal ions does not exceed the upper limits specified hereinbefore for the at least one metal ion contained in the particles.

In preferred embodiments the at least one metal ion or at least one of the at least one metal ion is a divalent metal ion.

In a special embodiment of the invention the at least one metal ion or at least one of the metal ions is $Ca^{2+}$.

Due to the silicate particles used according to the invention, unwanted surface-active constituents can be removed from the starting materials or intermediate products of beverages at a relatively low level of effort and inexpensively as those unwanted constituents are bound to the surfaces of the silicate particles so that by subsequent separation of the silicate particles in the course of the production process, the substances bound to the surfaces thereof are also removed without in that case markedly impairing the aroma profile of the product.

In that way for example the hydrophobins which emerge in beer brewing, proteases and polar lipids can be removed, whereby one of the major causes of gushing can be eliminated.

The advantage of using silicate particles with a proportion of at least one of the above-specified metal ions in the specified ranges is that in that way fruit acids which are unwanted in the end product or in the production process of beverages can be reduced or indeed completely removed with a relatively slight effort and inexpensively without in that respect noticeably impairing the aroma profile of the product as the fruit acids such as for example oxalic acid bind to the metal ions present in the silicate particles so that the fruit acids bound to the surfaces of the silicate particles can be removed in the course of the production process by subsequently separating off the silicate particles.

Therefore for example when brewing beer the essential identified causes of gushing can be eliminated with the silicate particles according to the invention, namely a high oxalate content as well as surface-active hydrophobins and proteases.

In contrast to the oxalate precipitation known from the state of the art with calcium chloride or calcium sulfate the silicate particles of the present invention also have the decisive advantage that the added particles can be removed completely again for example by filtration.

Moreover, using the silicate particles according to the invention increases the pH value, thereby greatly reducing the solubility of the salts from the above-specified metals with fruit acids. Accordingly this promotes precipitation of the corresponding salts. Moreover the increase in the pH value is also advantageous in terms of protein aggregation.

The term silicates is used in accordance with the present invention to denote polycondensates of ortho-silicic acid such as for example kieselsol and kieselguhr but also all silicate minerals such as for example nesosilicates, sorosilicates, cyclosilicates, chain and band silicates, sheet silicates, framework silicates and amorphous silicates.

Preferably the silicate particles at least partially comprise a sheet silicate. Sheet silicates (also known as leaf or phyllo silicates) in accordance with the present invention are silicates whose silicate anions comprise layers of corner-linked $SiO_4$ tetrahedra, wherein the layers are not linked together by way of further Si—O bonds. According to the invention these embrace the silicate minerals of the mica, chlorite and serpentine group as well as kaolin and the sheet silicate clay minerals.

In certain embodiments of the invention the silicate particles at least partially comprise a sheet silicate clay material. The sheet silicate clay materials include the minerals of the talc-pyrophyllite, the smectite, the vermiculite and the mica group. In still more specific embodiments of the invention the sheet silicate clay material is a mineral of the smectite group such as for example a montmorillonite, beidellite, nontronite, saponite or hectorite.

In a preferred embodiment of the invention the silicate particles at least partially comprise a montmorillonite clay.

In a particularly preferred embodiment the silicate particles at least partially comprise montmorillonite clay-bearing bentonite.

The silicate particles used according to the invention are preferably in the form of a powder or granular material.

The wording "the silicate particles at least partially comprise" includes in accordance with the present invention both those embodiments in which only a part of the particles of the particulate material are silicate particles which comprise the specified material, and also those embodiments in which all particles of the particulate material are silicate particles which consist of the specified material. In addition that expression in accordance with the present invention also embraces those embodiments in which all or only a part of the particles of the particulate material only in part or completely comprise the specified material. For example the present invention also embraces those embodiments in which the particles in relation to the total weight of the particles comprise the specified silicate material in respect of 70% by weight, 80% by weight, 85% by weight, 90% by weight, 92% by weight, 95% by weight, 98% by weight, 98.5% by weight, 99% by weight or 100% by weight.

To achieve the above-described advantages of the silicate particles according to the invention with the specified proportions of at least one of the specified metal ions, in the case of the silicate particles which do not inherently involve those proportions the silicate particles are preferably enriched with at least one metal ion selected from a metal ion of the elements La, Ce, Cu, Ag, Zn, Sn, Ca, Mg, Fe, Mn and combinations thereof.

In that respect the term "enriched" is used to denote increasing the proportion of the respective metal ion in relation to the proportion of the metal ion in the "original" silicate particle. If for example silicate particles which are formed by a bentonite inherently have a Ca content of 1% by weight with respect to the total weight of the particles, then an enriched silicate particle in accordance with the present invention occurs if with respect to the total weight of the particles there is an increase in the original Ca content of the silicate particles to over 1% by weight of Ca, like for example to 1.5% by weight of Ca.

Preferably the silicate particles of the present invention are enriched in particular at their surface with at least one of the above-specified metal ions, wherein that enrichment results in silicate particles in which, with respect to the total proportion of the at least one metal ion, at least 50% by weight of that metal ion are on the surface. Preferably, with respect to the total proportion of the at least metal ion, at least 60% by weight, at least 70% by weight, at least 80% by weight, at least 90% by weight, at least 95% by weight or indeed at least 99% by weight are on the surface, wherein the proportion of the metal ion on the surface is particularly great preferably in the embodiments which have a relatively high total content of the respective metal ion.

The silicate particles of the present invention, in particular due to the proportion thereof in respect of at least one of the specified metal ions in the specified ranges, in the form of crystallization seeds, induce the production of metal-fruit acid crystals like for example oxalate crystals. Those crystals grow very well and quickly on the silicate particles as the silicate particles of the present invention have a large surface area.

To achieve a contact surface area which is as large as possible with the intermediate products or the starting materials to be processed certain embodiments of the silicate particles according to the invention have a BET surface area in the region of 5-850 $m^2/g$. Preferably the BET surface area is >100 $m^2/g$, still more preferably >250 $m^2/g$ and particularly preferably >500 $m^2/g$, wherein determination of the BET surface area is effected by means of nitrogen adsorption at a temperature of 77 K in accordance with DIN ISO 9277:2003-05.

In certain embodiments of the invention the silicate particles are characterised in that they have a cation exchange capacity (CEC) of between 5 and 100 meq/100 g, wherein the cation exchange capacity is effected in accordance with the method described by Dohrmann and Kaufhold in "Determination of exchangeable calcium of calcareous and gypsiferous bentonites" in the year 2010 in "Clays and Clay Minerals" Vol. 58, pages 513-522. Preferably the cation exchange capacity is <75 meq/100 g, still more preferably <60 meq/100 g.

In certain embodiments of the invention the silicate particles are characterised in that the silicate particles with respect to the total weight of the particles have a proportion of Fe (II)<10% by weight. In preferred embodiments the silicate particles with respect to the total weight of the particles have a proportion of Fe (II)<1% by weight. Still more preferably the proportion of Fe (II) in the silicate particles with respect to the total weight of the particles is <1% by weight.

The present invention also concerns a method of producing a beverage in which the silicate particles in accordance with the invention are added in the course of the production process to a starting material or an intermediate product of the beverage and are then separated off again prior to finishing the beverage.

Examples of beverage production processes in which the silicate particles in accordance with the present invention are used are wine production, the production of fruit juices and brewing beer. In that respect the silicate particles according to the invention can be added in various phases of the production process to a starting material or an intermediate product of the beverage and then separated off again prior to finishing of the beverage, in which respect the time of the addition operation and the time of the subsequent separation operation depends on the respective beverage and the individual production process. The necessary dosages depend on the brewing water used and are in the region of between 80 and 120 g/hl of mash, preferably at 100 g/hl of mash.

In a preferred beer brewing process in which silicate particles having the above-specified features are used the silicate particles of the invention are added to the mash. In a preferred embodiment the particles are added to the mash by way of the brewing water. In a specific embodiment the silicate particles are additionally also added to the fermentation process. In brewing beer the operation of separating off the silicate particles is preferably effected in the purifying operation together with the spent malt and/or in the filtering operation after the fermentation process.

The use of the method according to the invention in beer brewing can already remove from the wort during the mash process the assumed causes of uncontrolled foaming of beer, namely high oxalate content and surface-active hydrophobins and proteases. The residual post-precipitation can be eliminated in the final yeast separation operation or filtration step.

According to the invention the silicate particles are preferably introduced prior to or during the mash process. In the mash the silicate particles react with the oxalic acid present and the oxalic acid almost completely precipitates out as Ca oxalate bound to the silicate particles. In addition the silicate particles increase the pH value of the brewing water and thus reduce the solubility of calcium oxalate, which promotes the precipitation thereof. The precipitated oxalate can thus already be removed in the purifying operation together with the spent malts.

Normally a brewing water in the pH range of between 5.2 and 5.4 is used for the mash. With the method proposed here the pH-value of the brewing water is increased to up to pH>5.8. That pH-value shift not only reduces the solubility of calcium oxalate but at the same time also reduces the aggregation of the 17 kD hydrophobin and thus overall the gushing potential. In addition hydrophobins and proteases are already reduced in the mash and are removed from the wort in the purifying operation (see FIG. 3).

The precipitated products are thus already almost completely removed for the major part in the purifying operation with the spent grain so that no additional method step is required.

In addition there is also an entire series of further advantages in using the silicate particles according to the invention in beer brewing in comparison with the state of the art.

Thus due to the difficult solubility of the substances used there is almost no mineral change in the beer and thus also no sensory impairment. In professional tasting sessions (the DLG (German Agricultural Society) system) the beers treated with the new method, in comparison with the conventionally treated beers, were even assessed as having higher "drinkability".

In addition the hop yields of the beers treated with the silicate particles according to the invention were about 8-10% higher than those of the standard beers. In the comparative tests better levels of foam stability could also be found. At the same time no reduction at all in the chemical-physical durability of the beers was found, and it was also not possible to find any yield worsening (extract) by virtue of the somewhat higher pH-value of the mash.

Moreover the silicate particles according to the invention are in conformity with the German Purity Law in accordance with the Bavarian State Order of 1516.

For the purposes of the original disclosure it is pointed out that all features as can be seen by a man skilled in the art from the present description, the Figures and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

It is further pointed out that it is self-evident to the man skilled in the art that the embodiments by way of example hereinafter only serve to set out by way of example the possible embodiments of the present invention, which are set forth as specific embodiments. The man skilled in the art will therefore readily understand that in addition all other embodiments having the features or combinations of features according to the invention as recited in the claims are within the scope of protection of the invention. The comprehensive explicit representation of all conceivable embodiments is dispensed with here only for the sake of brevity and readability of the description.

EXAMPLES

1. Investigation of Precipitation by Scanning Electron Microscopy (SEM)

Figure 2:
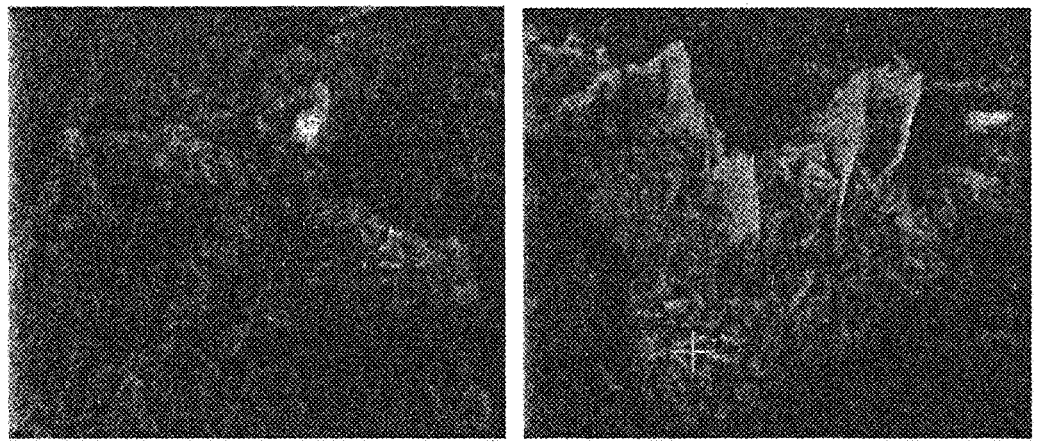
FIG. 2 shows the SEM phase contrast images of silicate particles according to the invention on the basis of bentonite.

The growth of Ca-oxalate crystals on the surface of the silicate particles was investigated using SEM (see FIG. 1 and FIG. 2). For that purpose the samples (1 ml) were centrifuged prior to the investigation (10000 rpm) and washed with autoclaved desalinated water, repeatedly centrifuged and made up to 100 μl (about 10 times concentration). Then 10 μl of the cleaned suspensions were respectively distributed on aluminum supports. The samples were then dried at 50° C. under vacuum (diaphragm pump: 13 mbar; pressure gradient: 1013 mbar/13 mbar/30 min) the almost salt-free samples were investigated after the drying operation directly without evaporation using the scanning electron microscope. In that case the contents of the elements (C, O, Na, K, Si, Fe, Ca, Al) for calculation of the composition of the respective structure were measured by X-ray fluorescence technology integrated in the apparatus.

In detail FIG. 1 shows phase contrast images (200×) of:
left: Ca silicate particles based on pure silicate (silicic acid) prior to use, and
right: growth of Ca oxalate on the surface of the particles after use.

In detail FIG. 2 shows phase contrast images (200×) of:
left: Ca bentonite particles prior to use, and
right: growth of Ca oxalate on the surface of the particles after use (white cross=Ca oxalate).

2. Hydrophobin Binding Activity to Silicate Particles

The hydrophobin binding activity to silicate particles was investigated by means of SDS-PAGE. In that case, with a dosage of 100 g/hl, it was possible to achieve a depletion by <30%. Analysis was implemented with a hydrophobin cell extract from *Fusarium* fungi (FIG. 3).

The hydrophobin exhibits a band at about 17 kDa (left in FIG. 3) and a further dimmer band at 40 kDa.

Figure 3:
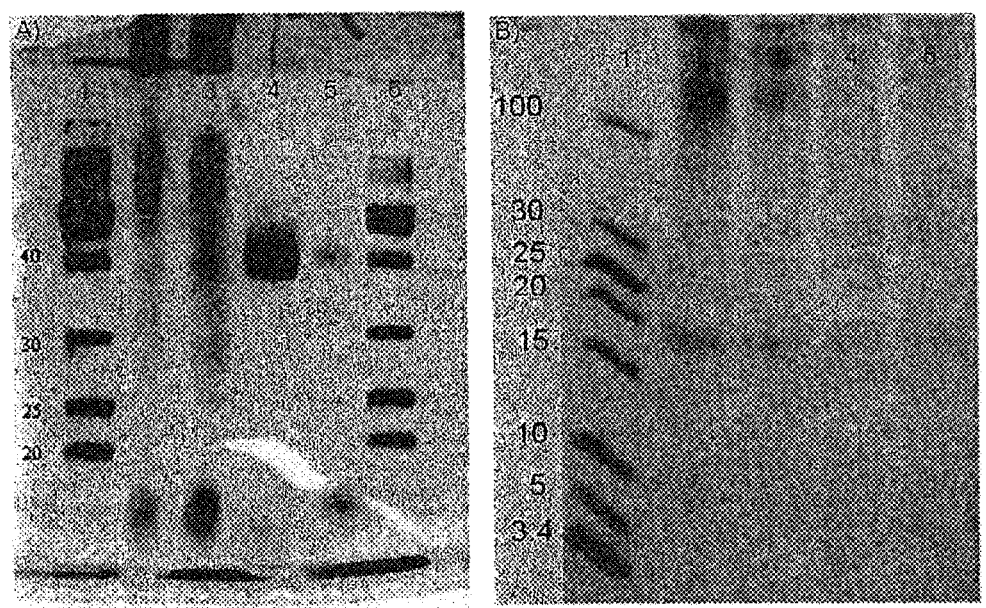
FIG. 3 shows the result of a hydrophobin analysis by means of SDS-PAGE.

In detail FIG. 3 shows:
left: 1) marker 10 μl, 2) hydrophobin (1:50) 6 μl, 3) hydrophobin (1:20) 6 μl, 4) wort 18 μl, 5) beer 18 μl, 6) marker 6 μl
right: 1) marker 5 μl, 2)+3) hydrophobin-bearing beer, 3)+4) hydrophobin-bearing beer after silicate particle treatment.

The invention claimed is:

1. A method for brewing beer, wherein material particles are added in the course of the method to a mash comprising a fruit acid and are then separated off again prior to finishing of the beer, wherein the material particles comprise silicate particles and wherein the material particles comprise at least about 90 wt. % silicate, wherein the silicate comprises $Ca^{2+}$ in the range of between 5% by weight and 30% by weight, and wherein the silicate particles are enriched at their surface with $Ca^{2+}$ such that at least about 50 wt. % of the $Ca^{2+}$ is located on the surface, and wherein the material particles are added to the mash in a range of about 80 g/hl to 120 g/hl.

2. The method for brewing beer as set forth in claim 1, wherein the silicate particles are comprised of at least 90 wt. % of a sheet silicate.

3. The method for brewing beer as set forth in claim 1, wherein the silicate particles are comprised of at least 90 wt. % of a montmorillonite clay.

4. The method for brewing beer as set forth in claim 1, wherein the silicate particles are comprised of at least 90 wt. % of bentonite.

5. The method for brewing beer as set forth in claim 1, wherein the silicate particles have a BET surface area in the range of between 5 and 850 $m^2/g$.

6. The method for brewing beer as set forth in claim 1, wherein the silicate particles have a cation exchange capacity (CEC) of between 5 and 100 meq/100 g.

7. The method for brewing beer as set forth in claim 1, wherein the silicate particles with respect to the total weight of the particles have a proportion of Fe (II)<10% by weight.

8. The method for brewing beer as set forth in claim 1, wherein the silicate particles are added to the mash by way of a brewing water.

9. The method for brewing beer as set forth in claim 1, wherein the silicate particles are also added to a fermentation process.

10. The method for brewing beer as set forth in claim 1, wherein the silicate particles are at least partially separated off in a purifying step with spent malt.

11. The method for brewing beer as set forth in claim 1, wherein the silicate particles are also separated off in a filtering operation after a fermentation process.

12. The method for brewing beer as set forth in claim 2, wherein the silicate particles have a BET surface area in the range of between 5 and 850 $m^2/g$.

13. The method for brewing beer as set forth in claim 2, wherein the silicate particles have a cation exchange capacity (CEC) of between 5 and 100 meq/100 g.

14. The method for brewing beer as set forth in claim 2, wherein the silicate particles with respect to the total weight of the particles have a proportion of Fe (II)<10% by weight.

15. The method for brewing beer as set forth in claim 3, wherein the silicate particles have a BET surface area in the range of between 5 and 850 $m^2/g$.

16. The method for brewing beer as set forth in claim 3, wherein the silicate particles have a cation exchange capacity (CEC) of between 5 and 100 meq/100 g.

17. The method for brewing beer as set forth in claim 3, wherein the silicate particles with respect to the total weight of the particles have a proportion of Fe (II)<10% by weight.

18. The method for brewing beer as set forth in claim 1, wherein the fruit acid comprises oxalic acid.

\* \* \* \* \*